United States Patent [19]

Yukuta et al.

[11] 4,259,452

[45] Mar. 31, 1981

[54] METHOD OF PRODUCING FLEXIBLE RETICULATED POLYETHER POLYURETHANE FOAMS

[75] Inventors: Toshio Yukuta; Kazuo Yagura; Nobuhisa Fuchigami, all of Yokohama, Japan

[73] Assignee: Bridgestone Tire Company Limited, Tokyo, Japan

[21] Appl. No.: 39,414

[22] Filed: May 15, 1979

[30] Foreign Application Priority Data

May 15, 1978 [JP] Japan ................................. 53/56606

[51] Int. Cl.³ ..................... C08G 18/14; C08G 18/32; C08G 18/48
[52] U.S. Cl. ..................................... 521/52; 521/127; 521/128; 521/914
[58] Field of Search .................. 521/52, 914, 127, 128

[56] References Cited

U.S. PATENT DOCUMENTS

| | | | |
|---|---|---|---|
| 3,717,597 | 2/1973 | Hesskamp et al. | 521/906 |
| 3,799,898 | 3/1974 | Lamplugh et al. | 521/52 |
| 3,865,762 | 2/1975 | Repiquet et al. | 521/914 |
| 3,873,476 | 3/1975 | Jabs et al. | 521/914 |
| 3,887,505 | 6/1975 | Demon et al. | 521/914 |
| 4,144,386 | 3/1979 | Consoli et al. | 521/914 |
| 4,167,612 | 9/1979 | Tucker et al. | 521/52 |

FOREIGN PATENT DOCUMENTS

| | | | |
|---|---|---|---|
| 1406036 | 6/1965 | France | 521/128 |
| 2129823 | 11/1972 | France | 521/914 |

*Primary Examiner*—H. S. Cockeram
*Attorney, Agent, or Firm*—Sughrue, Rothwell, Mion, Zinn and Macpeak

[57] ABSTRACT

A method of producing flexible polyether polyurethane foams, which have a substantially skeletal reticulated structure, is disclosed. When the flexible foam is produced by reacting a polyhydroxyl compound with an organic polyisocyanate in the presence of a blowing agent by one-shot process, a catalyst and other additives, a mixture of (a) poly(oxyethylene-oxypropylene)-polyether polyol containing 51 to 98% by weight of ethylene oxide component and (b) poly(oxyethylene-oxypropylene)polyether polyol containing not less than 51% by weight of propylene oxide component is used as the polyhydroxyl compound.

7 Claims, No Drawings

METHOD OF PRODUCING FLEXIBLE RETICULATED POLYETHER POLYURETHANE FOAMS

This invention relates to a method of producing flexible polyurethane foams and more particularly to a method of producing a flexible polyether polyurethane foam having a high permeability and a substantially skeletal reticulated structure by a one-shot process.

In general, flexible polyurethane foams have some permeability because a part of the cell walls in the cellular structure of the foam is ruptured during the foaming. However, these foams cannot be used for applications requiring a high permeability, such as filters and the like, because almost all of the remaining cell walls largely offer resistance to pass gas or fluid through the foam. Now, it is desired to develop polyurethane foams having a substantially skeletal reticulated structure.

Hitherto, there have been proposed various methods of producing reticulated polyurethane foams, which are divided into two categories. That is, a first category is a method of removing cell walls by post treatment of the foam, such as (a) post treatment with an alkali aqueous solution (Japanese Patent Application Publication No. 8,137/59) and (b) post treatment with heat (U.S. Pat. No. 3,175,025 and U.S. Pat. No. 3,390,106), while a second category is a method of producing reticulated foams by a one-shot process, such as (a) addition of particular oily organic compounds (Japanese Patent Application Publication No. 18,796/68, No. 18,797/68, No. 19,039/68, No. 27,640/68 and No. 20,479/69) and (b) use of a mixture of polyether polyol and polyester polyol as a polyhydroxyl compound (U.S. Pat. No. 3,748,288 and U.S. Pat. No. 3,884,848).

Although the post treatment with alkali aqueous solution for removal of cell walls is applicable to both polyether polyurethane foam and polyester polyurethane foam, it is mainly applied to the polyester foam in view of its handling ease. However, the polyester foam is considerably expensive as compared with the polyether foam and also its production cost is expensive as compared with the case of producing usual polyurethane foams. On the other hand, the post treatment with heat may also be applicable to both polyether and polyester polyurethane foams, but a continuous operation cannot be performed at the heating stage, so that a batch operation is used. As a result, a greater amount of reticulated foam cannot be produced at once and also the production cost becomes very expensive as compared with the case of producing usual polyurethane foams.

Under the above circumstances, there have been proposed methods of producing reticulated foams by a one-shot process without the post treatment as mentioned above. In the method of adding a particular oily organic compound, however, the range of the addition amount is considerably narrow for the achievement of optimum result, so that it is impossible to get this method into a practical production process. That is, if the addition amount of the organic compound is slightly out of the range for the achievement of optimum results, there are caused such phenomena that the cell walls are not removed from the foam and that the collapse of the foam is caused at the foaming stage, so that it is very difficult to produce reticulated foam industrially and stably. On the other hand, when a mixture of polyether polyol and polyester polyol is used as the polyhydroxyl compound for the production of reticulated foam by a one-shot process, since the polyester polyol is an essential ingredient, the resulting foam is very poor in hydrolytic stability and cannot be utilized for certain applications.

The inventors have made various studies with respect to a method of producing reticulated foams, which solves the above mentioned drawbacks of the prior art, and as a result, it has been found that the reticulated foams can be obtained when a mixture of particular poly(oxyethylene-oxypropylene)polyether polyols is used as the polyhydroxyl compound.

According to the invention, there is provided a method of producing a flexible polyether polyurethane foam by reacting a polyhydroxyl compound with an organic polyisocyanate in the presence of a catalyst, a blowing agent, a surfactant and other additives by a one-shot process, characterized in that as the polyhydroxyl compound there is used a mixture of (a) poly(oxyethylene-oxypropylene)polyether polyol containing 51 to 98% by weight of ethylene oxide component [hereinafter referred to as polyether-polyol (a)] and (b) poly(oxyethylene-oxypropylene)polyether polyol containing not less than 51% by weight of propylene oxide component [hereinafter referred to as polyetherpolyol (b)] to form a foam having a substantially skeletal reticulated structure.

The polyether-polyol (a) to be used in the invention include ones obtained by an addition polymerization of an active hydrogen compound having two or more functional groups with ethylene oxide and propylene oxide in such a manner that the ethylene oxide component is 51 to 98% by weight. In the chemical structure of this polymer, the position of the ethylene oxide component is not particularly critical, so that the ethylene oxide may be bonded to the propylene oxide at random or in a block fashion. Further, the ethylene oxide is not necessarily bonded to an end of the polyol.

The polyether-polyol (b) to be used in the invention include ones obtained by an additional polymerization of an active hydrogen compound having two or more functional groups with ethylene oxide and propylene oxide in such a manner that the propylene oxide component is not less than 51% by weight. In the chemical structure of this polymer, the position of the propylene oxide component is not particularly critical like the case of the polyether-polyol (a).

According to the invention, a mixture of the polyether-polyol (a) and the polyether-polyol (b) is used as a polyhydroxyl compound to be reacted with an organic polyisocyanate. In this case, a mixing ratio of polyether-polyol (a) to polyether-polyol (b) is 1:9-9:1 on a weight basis. Moreover, the hydroxyl number of each of the polyether-polyols (a) and (b) is not critical, but the mixture of the polyether-polyols (a) and (b) has an average hydroxyl number of 30 to 70, preferably 40 to 60.

The active hydrogen compounds to be used as a starting material for the production of the polyether-polyols (a) and (b) include, for example, polyalcohols, polyamines and the like. As the polyalcohol, mention may be made of ethylene glycol, propylene glycol, glycerin, trimethylol propane, 1,2,6-hexanetriol, pentaerythritol, sucrose and the like. As the polyamine, mention may be made of ethanolamine, tolylenediamine, triethanolamine, ethylenediamine and the like.

In the mixture of the polyether-polyols (a) and (b) according to the invention, a certain combination of the polyether-polyols (a) and (b) may hardly melt into each other, but in this case it is sufficient to thoroughly stir the mixture just before the foaming. Further, in the production of the flexible polyether polyurethane foam having a substantially skeletal reticulated structure, a better result can be obtained when the viscosity of the mixture of the polyether-polyols (a) and (b) is high. To this end, the viscosity of the mixture may be increased by lowering the temperature of the mixture just before the foaming.

According to the invention, there may be used various organic polyisocyanates for the reaction with the polyhydroxyl compound, typical examples of which include tolylene diisocyanate, phenylene diisocyanate, diphenylmethane diisocyanate, 4,4'-diphenyl diisocyanate, cyclohexane diisocyanate, 1,6-hexamethylene diisocyanate, isophorone diisocyanate, polyphenyl-polymethylene polyisocyanate obtained by the reaction of an aniline-formaldehyde condensate with phosgene, and the like. These polyisocyanates may be used alone or in admixture of two or more polyisocyanates.

As the catalyst, use may be made of any ones commonly used in the production of polyurethane foams, such as organotin compounds, amines and the like. As the organotin compounds, mention may be made of stannous octoate, stannous oleate, dibutyltin dilaurate, dibutyltin di-2-ethylhexoate, dibutyltin diacetate and the like. Although the kind of the organotin compound to be used is not particularly critical, it is preferable to use tetravalent tin compounds such as dibutyltin dilaurate or the like rather than bivalent tin compounds such as stannous octoate or the like in order to achieve the object of the invention in view of the foaming stability.

When the organotin compound is used as the catalyst, it should be added in an amount of not more than 0.1 part by weight based on 100 parts by weight of the polyhydroxyl compound. If the addition amount exceeds 0.1 part by weight, cell walls remain in the resulting foam, so that such an amount cannot achieve the object of the invention. On the other hand, when the addition amount is decreased considerably, the foaming stability becomes poor and cracks are apt to be caused. In this case, it has been found that these drawbacks may be solved by an addition of urea. That is, when the amount of the organotin compound catalyst is very small, if the urea is added in an amount of 0.05 to 5 parts by weight based on 100 parts by weight of the polyhydroxyl compound, reticulated foams can be obtained stably.

As the amine catalyst, use may be made of any ones commonly used in this field, examples of which include triethylamine, triethylenediamine, N-ethylmorpholine, dimethylethanolamine, dimethylbenzylamine, 1,8-diaza-bicyclo(5,4,0)undecene-7 and phenolate thereof, formic acid salt of triethylenediamine and the like.

The surfactant to be used in the invention is a silicone surfactant usually used in the production of polyurethane foams. Particularly, the cell size of the reticulated foam of the invention can be controlled by optionally selecting the silicone surfactant. That is, when using a silicone surfactant having a low foam-stabilizing activity, such as silicone surfactants for the production of semi-rigid polyurethane foam or for cold curing, there can be obtained foams having a reticulated macrocell structure. When using a silicone surfactant having a high foam-stabilizing activity such as silicone surfactants for hot curing, there can be obtained foams having a reticulated microcell structure.

According to the invention, water (reacting with the organic polyisocyanate to produce carbon dixoide gas) is mainly used as the blowing agent. If necessary, air and low-boiling organic compounds such as monofluorotrichloromethane, methylene chloride and the like may be used. The amount of water added can freely be selected in accordance with the density of the reticulated foam to be produced, but it is preferably not less than 4.5 parts by weight based on 100 parts by weight of the polyhydroxyl compound.

In addition to the above mentioned ingredients, a filler, an antistatic agent, a coloring agent and a flame retardant may be added in accordance with performances required for the foam without departure from the scope of the invention.

According to the invention, flexible polyether polyurethane foams having a substantially skeletal reticulated structure can be produced by any conventionally known one-shot processes starting from the foam forming composition comprising the above mentioned ingredients. In this case, since a better result for the production of reticulated foams is obtained by increasing the viscosity of the mixture of the polyether-polyols (a) and (b) as mentioned above, the liquid temperature of this mixture is made to be as low as 18° to 20° C. below the temperature usually practised, whereby the reticulated foams having a good foaming stability and a uniform cell size are obtained.

According to the invention, flexible polyether polyurethane foams having a good foaming stability and a substantially skeletal reticulated structure, which are entirely different from the structure of the flexible polyurethane foams commonly produced, can be produced economically by a one-shot process as mentioned above, so that the permeability of the resulting foam is very good. Therefore, the foams according to the invention are useful for application requiring high permeability, such as various filters in air conditioning equipment, filters in an air compressors, blowers and engines for an engine-driving system, filters in an air cleaners and humidifiers, oil filters for liquid filtration, filters for various chemical liquids, filters for cleaning of water and the like.

Further, the flexible polyether polyurethane foams having a substantially skeletal reticulated structure according to the invention have good hydrophilicity as compared with the conventional foams made from a polyoxypropylene polyol because the mixture of particular poly(oxyethylene-oxypropylene)polyether polyols, which has hydrophilicity, is used as the polyhydroxyl compound for the production of the foam. Therefore, the foams according to the invention are also suitable for applications requiring hydrophilicity, such as media for plant cultivation and the like. Moreover, when the foams according to the invention are used for clothing, comfortable, feeling and the like are superior to those of common foams.

The following examples are given in illustration of the invention and are not intended as limitations thereof.

EXAMPLES 1-2

A foam forming composition having a compounding recipe shown in the following Table 1 was foamed by means of a foaming machine to obtain a flexible polyether polyurethane foam having a substantially skeletal reticulated structure, the properties of which were measured to obtain results as shown in Table 1.

Moreover, the hydroxyl number of the mixture of polyether-polyols (a) and (b) was 52, the liquid temperature of the composition just before the foaming was 20° C. and the rise time was 70 to 80 seconds.

TABLE 1

|  | Example 1 | Example 2 |
|---|---|---|
| Compounding recipe (part by weight) | | |
| polyether-polyol (a)[1] | 70 | 70 |
| polyether-polyol (b)[2] | 30 | 30 |
| water | 5.2 | 5.2 |
| triethylenediamine | 0.05 | 0.05 |
| dibutyltin dilaurate | 0.01 | 0.01 |
| urea | 1.0 | 1.0 |
| tricresyl phosphate | 1.24 | 1.24 |
| L-544[3] | 0.5 | — |
| L-5302[4] | — | 0.5 |
| TDI-80[5] | 64 | 64 |
| isocyanate index[6] | 110 | 110 |
| Foaming machine | UBT-65 type, made by Hennecke | LC-1 type, made by Hennecke |
| Properties | | |
| foam density (g/cm³) | 0.0184 | 0.0185 |
| hardness of foam[7] | | |
| 25% ILD (kg/200 mmϕ) | 6.0 | 6.0 |
| 65% ILD (kg/200 mmϕ) | 12.6 | 12.5 |
| tensile strength (kg/cm²) | 1.83 | 0.70 |
| elongation (%) | 352 | 173 |
| tear strength (kg/cm) | 1.33 | 0.95 |
| permanent compressive strain (%) (50% compression, 70° C. · 22 hrs) | 9 | 11 |
| number of cells (cells/25 mm) | 18–22 | 8–9 |
| permeability (cc/cm²/sec)[8] | >380 | >380 |

Note:
[1] poly (oxyethylene-oxypropylene) triol containing about 70% by weight of randomly bonded ethylene oxide component and a hydroxyl number of 50, made by Sanyo Kasei Kogyo Co. Ltd., trade name FA-103.
[2] poly (oxyethylene-oxypropylene) triol containing about 98% by weight of randomly bonded propylene oxide component and a hydroxyl number of 56, made by Mitsui Nisso Urethane Co. Ltd., trade name MN-3050.
[3] trade name, made by Nippon Unicar Co. Ltd., a silicone surfactant for hot curing with a high foam-stabilizing activity.
[4] trade name, made by Nippon Unicar Co. Ltd., a silicone surfactant for cold curing with a low foam-stabilizing activity.
[5] trade name, made by Nippon Polyurethane Co. Ltd., mixture of 80% by weight of 2,4-tolylene diisocyanate and 20% by weight of 2,6-tolylene diisocyanate.
[6] ratio of isocyanate equivalent of the polyisocyanate to hydroxyl equivalent of the active hydrogen compound.
[7] measured according to JIS K6401.
[8] measured according to ASTM D-737-46 (fragile type air permeability meter of fabrics)

The presence of cell walls in the polyurethane foam is determined by the permeability. For instance, the permeability of the flexible polyurethane foam commonly produced is within a range of 3 to 6 ft³/min according to the permeability test of ASTM D-1564 (using a Dow air flow meter). In the reticulated foam according to the invention, however, the permeability could not be measured according to the above test because it fairly exceeds the measuring limit (10 ft³/min). The permeability of the foam according to the invention was measured according to the permeability test of ASTM D-737-46 (using a fragile type air permeability meter of fabrics) as shown in Table 1, which is applied to highly permeable materials. In this case, a value exceeding the measuring limit (380 cc/cm²/sec) was obtained, which shows that the foams according to the invention have a very excellent permeability.

EXAMPLES 3–6

A foam forming composition having a compounding recipe shown in the following Table 2 was mixed by means of a small size laboratory agitator and then foamed to obtain a flexible polyether polyurethane foam having a substantially skeletal reticulated structure, the properties of which were measured to obtain results as shown in Table 2.

TABLE 2

|  | Ex. 3 | Ex. 4 | Ex. 5 | Ex. 6 |
|---|---|---|---|---|
| Compounding recipe (part by weight) | | | | |
| polyether-polyol (a) | 70 | 70 | 60 | 60 |
| polyether-polyol (b) | 30 | 30 | 40 | 40 |
| water | 5.2 | 5.2 | 5.2 | 5.2 |
| triethylenediamine | 0.05 | 0.05 | 0.05 | 0.05 |
| dibutyltin dilaurate | 0.02 | 0.02 | 0.01 | 0.01 |
| urea | — | — | 1.0 | 1.0 |
| tricesyl phosphate | 1.24 | 1.24 | 1.24 | 1.24 |
| L-544 | — | 0.5 | 0.5 | — |
| L-5302 | 0.5 | — | — | 0.5 |
| TDI-80 | 61 | 61 | 64 | 64 |
| isocyanate index | 105 | 105 | 110 | 110 |
| Properties | | | | |
| foam density (g/cm³) | 0.0180 | 0.0183 | 0.0190 | 0.0187 |
| hardness of foam 25% ILD (kg/200 mmϕ) | — | — | 5.8 | 6.1 |
| number of cells (cells/25 mm) | 8–10 | 18–22 | 18–22 | 8–10 |
| permeability (cc/cm²/sec) | >380 | >380 | >380 | >380 |

Note:
The polyether-polyols (a) and (b) used are the same as Example 1.

EXAMPLE 7

The same procedure as described in Example 2 was repeated, except that a polyether-polyol (b) having the same chemical structure and a hydroxyl number of 48 was used instead of the polyether-polyol (b) of Example 2 and the hydroxyl number of the mixture of the polyether-polyols (a) and (b) was 49, to obtain a flexible polyether polyurethane foam having a substantially skeletal reticulated structure, the properties of which are as follows;

| Foam density (g/cm³) | 0.0185 |
|---|---|
| Hardness of foam | |
| 25% ILD (kg/200 mmϕ) | 5.4 |
| 65% ILD (kg/200 mmϕ) | 11.5 |
| Tensile strength (kg/cm²) | 0.70 |
| Elongation (%) | 200 |
| Number of cells (cells/25 mm) | 8–10 |
| Permeability (cc/cm²/sec) | >380 |

COMPARATIVE EXAMPLES 1–4

A foam forming composition having a compounding recipe shown in the following Table 3 was mixed by means of a small size agitator for laboratory and then foamed to obtain a foam with the properties as shown in Table 3.

TABLE 3(a)

|  | Comparative Ex. 1 | Comparative Ex. 2 | Comparative Ex. 3 | Comparative Ex. 4 |
|---|---|---|---|---|
| Compounding recipe (part by weight) | | | | |
| polyether-polyol (a) | 100 | — | 70 | 70 |
| polyether-polyol (b) | — | 100 | 30 | 30 |
| water | 5.2 | 5.2 | 5.2 | 5.2 |
| triethylenediamine | 0.05 | 0.05 | 0.05 | 0.05 |
| dibutyltin dilaurate | 0.01 | 0.01 | 0.2 | 0.2 |
| urea | 1.0 | 1.0 | 1.0 | 1.0 |
| tricresyl phosphate | 1.24 | 1.24 | 1.24 | 1.24 |

TABLE 3(a)-continued

| | Comparative Ex. 1 | Comparative Ex. 2 | Comparative Ex. 3 | Comparative Ex. 4 |
|---|---|---|---|---|
| L-544 | 0.5 | — | — | — |
| L-5302 | — | 0.5 | 0.5 | 0.5 |
| TDI-80 | 64 | 64 | 64 | 64 |
| isocyanate index | 110 | 110 | 110 | 110 |

TABLE 3(b)

| | Comparative Example 1 | Comparative Example 2 | Comparative Example 3 | Comparative Example 4 |
|---|---|---|---|---|
| Foaming behavior | not foamed | large cavities are produced in the center of the foam | good | good |
| Properties | measurement impossible | measurement impossible | | |
| foam density (g/cm$^3$) | | | 0.0185 | 0.0187 |
| hardness of foam | | | | |
| 25% ILD (kg/200 mm$\phi$) | | | 7.6 | 8.2 |
| 65% ILD (kg/200 mm$\phi$) | | | 15.5 | 17.5 |
| tensile strength (kg/cm$^2$) | | | 0.44 | 0.39 |
| elongation (%) | | | 160 | 150 |
| number of cells (cells/25 mm) | | | 8–10 | 8–10 |
| permeability (cc/cm$^2$/sec) | | | <50 | <50 |

As is apparent from Table 3, when each of the polyether-polyols (a) and (b) is used alone as the polyhydroxyl compound, a satisfactory foam cannot be produced as shown in Comparative Examples 1 and 2. Further, when dibutyltin dilaurate is used in an amount of 0.2 part by weight as the organotin compound catalyst, removal of cell walls hardly occurs because the permeability is less than 50 as shown in Comparative Examples 3 and 4.

According to the invention, the flexible polyether polyurethane foams having excellent hydrolytic stability and hydrophilicity and a substantially skeletal reticulated structure can be produced stably and surely by a one-shot process, so that there is not required a step of removing cell walls of the foam by post-treatment under various restricted conditions. Therefore, there are not caused problems in operation and handling for the production of reticulated foams. Further, the practice of the invention is economical and easy.

What is claimed is:

1. A method for producing a flexible polyether polyurethane foam by reacting a polyhydroxyl compound with an organic polyisocyanate in the presence of a catalyst, a blowing agent, a surfactant and other additives by a one-shot process, characterized in that as said polyhydroxyl compound there is used a mixture of (a) 50–90 parts by weight of poly(oxyethylene-oxypropylene)polyether polyol containing 51 to 90% by weight of ethylene oxide component and (b) 10–50 parts by weight of poly(oxyethylene-oxypropylene)-polyether polyol containing not less than about 98% by weight of propylene oxide component to form a foam having a substantially skeletal reticulated structure.

2. A method as claimed in claim 1, wherein said mixture has an average hydroxyl number of 30–70.

3. A method as claimed in claim 1, wherein said catalyst is selected from organotin compounds and amine compounds.

4. A method as claimed in claim 3, wherein said organotin compound is selected from dibutyltin dilaurate, stannous octoate, stannous oleate, dibutyltin di-2-ethyl hexoate and dibutyltin diacetate.

5. A method as claimed in claim 4, wherein said dibutyltin dilaurate is used in an amount of not more than 0.1 part by weight based on 100 parts by weight of said polyhydroxyl compound.

6. A method as claimed in claim 1, wherein as said other additive is used urea in an amount of 0.05 to 5 parts by weight based on 100 parts by weight of said polyhydroxyl compound.

7. A method as claimed in claim 1, wherein as said blowing agent is used water in an amount of not less than 4.5 parts by weight based on 100 parts by weight of said polyhydroxyl compound.

* * * * *